Jan. 8, 1946.　　E. KARFIOL ET AL　　2,392,594
COMPOSITE DECORATIVE MATERIAL
Filed Nov. 4, 1944
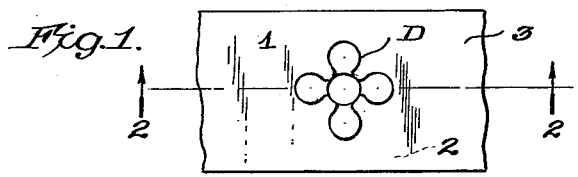
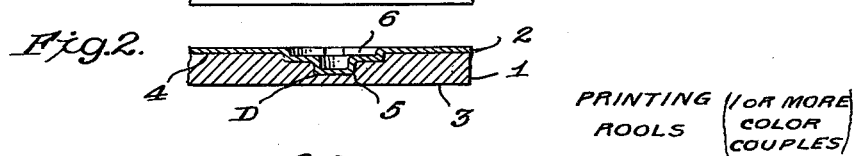
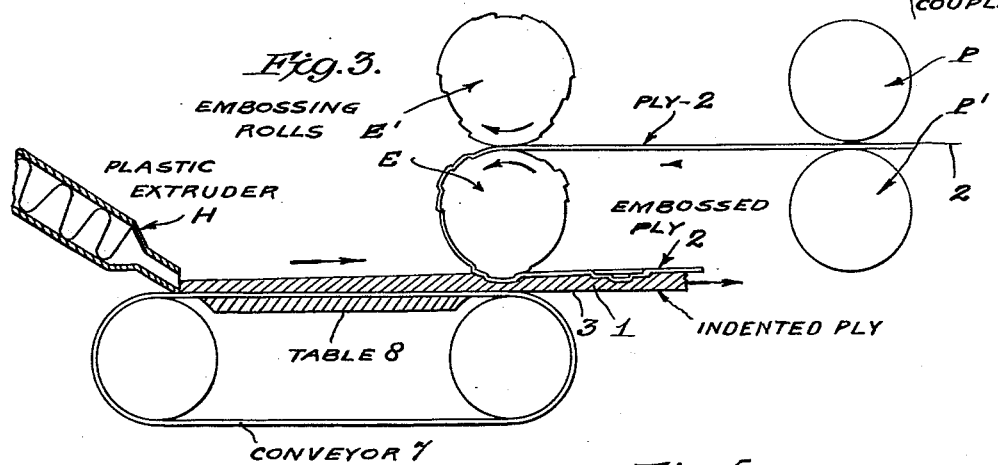
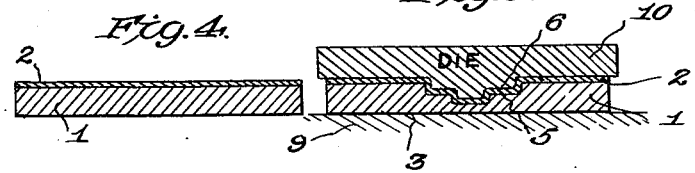
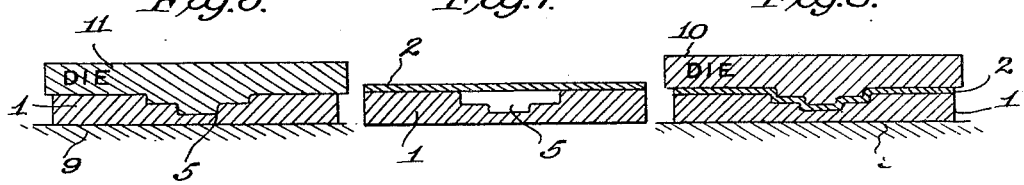
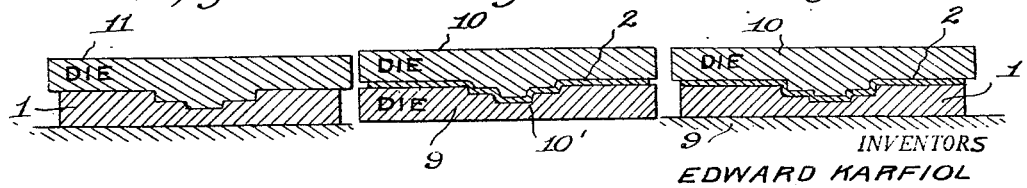
INVENTORS
EDWARD KARFIOL
WILLIAM A. ROEHM
BY Cornelius Zabriskie
ATTORNEY Patented Jan. 8, 1946

2,392,594

UNITED STATES PATENT OFFICE 2,392,594

COMPOSITE DECORATIVE MATERIAL

Edward Karfiol, Great Neck, and William A. Roehm, Rockville Centre, N. Y., assignors to Royal Lace Paper Works, Brooklyn, N. Y., a corporation of New York Application November 4, 1944, Serial No. 561,970

5 Claims. (Cl. 154—47)

This invention relates to shelf edgings, shelf coverings and other decorative articles, and is directed, more particularly, to an edging formed from a plurality of superimposed plies, usually two in number.

In practically carrying out this invention in the manufacture of shelf edging, we preferably print a design on one ply of material, then bring said ply into face abutting relation with a second ply of material, with the printed design between said two plies of material. We then emboss the printed ply in registration with the printing thereon and simultaneously press the printed portion of the first mentioned ply into the contacting face of the second mentioned ply so that the embossing on the embossed ply will register and interfit with indentations thus formed in the other ply. The ply which is indented as stated will be hereinafter referred to as the indented ply, while that which is embossed will be referred to as the embossed ply. Either face of the resulting multi-ply material may be employed as a wearing or exposed face in the finished article, but, in any event, that ply which forms such face is of transparent material.

The embossing of one of the plies and the interfitting of the same within the indentations of the other constitutes an important feature of this invention for this makes it possible to produce designs in either optical bas-relief or in different degrees of depressed relief, so that the design stands out in bold contrast to the background beneath the exposed surface of the multi-ply material. By this arrangement, we obtain striking effects in light and shadow to accentuate the three-dimensional effects thus produced.

The design may be printed upon the ply which is to carry it in either one or more colors, as may be desired; and if the article is to be used with the exposed face of the indented ply as the observable or wearing surface, this latter surface is preferably made smooth and unobstructed so as not to provide depressions or declivities therein in which dirt or other extraneous matter may lodge. It is within the purview of this invention, however, to form this face with a prism-like, corrugated, stippled, striated or other surface than one which is plane and smooth, and in some cases, this surface may even be provided with projecting bas-relief designs. Where this is done, the surface configuration of this face of the material should be such as to break up the glare reflected from the said surface and may also, in some cases, actually accentuate flow of light into the design so as to add to its three-dimensional appearance. This exposed surface may, moreover, be glossy or matt.

In any event, the printing which constitutes the design to be applied to the article is positioned upon the contacting faces of at least one of the plies so that in the finished article, such printing is housed between the plies and thus safeguarded and protected against damage by scratching or otherwise.

Various transparent plastic materials may be used for either or both plies, such, for example, as one or more of the synthetic resins or regenerated cellulose and one of said plies may be of any suitable material, but the wearing or visible ply should be transparent.

Features of the invention, other than those adverted to, will be apparent from the hereinafter detailed description and claims, when read in conjunction with the accompanying drawing.

The accompanying drawing shows one practical form of the article of this invention and different methods by means of which such article may be produced, but the showing therein made is to be understood as illustrative, only, and not as defining the limits of the invention.

In the drawing:

Figure 1 is a face view of an article embodying the present invention.

Figure 2 is a section on the line 2—2 of Figure 1.

Figure 3 shows consecutive steps in the forming of the article of Figure 1 according to one method of this invention.

Figures 4 and 5 diagrammatically show similar steps according to another method of producing the article of Figure 1.

Figures 6, 7 and 8 show the invention according to another method.

Figures 9, 10 and 11 are similar views showing still another method of making the invention.

The article of this invention may be of any suitable peripheral contour or shape and its edges may be straight, scalloped, curved or otherwise configurated. In the interests of clearness, the drawing shows exaggerated thickness, but it should be understood that the material may be made of any thickness without departing from this invention.

In the drawing, 1 designates the indented ply and 2 the embossed ply. The wearing or exposed face of the indented ply is designated 3 while its contacting face is designated 4. In this latter face are formed indentations 5 which correspond to the desired ornamentation or design. The embossed ply 2 is shown as embossed at 6, complementarily to the indentations 5 and interfitting with the same, so that all parts of the contacting faces of these two plies, including those parts which correspond to the design, conform to and contact with one another. The two plies are adhered together permanently either by a bond inherently produced between them or by an interposed adhesive, as may be desired.

In practice, the article may be so used as to be viewed from either face but the exposed face, which is adapted to be viewed in use, should be transparent, so as to show the design therethrough. If the ply 2 is to constitute the exposed or wearing ply, the design will appear in indented relief for the back of the embossing will be exposed at this surface. On the contrary, if the surface 3 of the ply 1 is to be that ordinarily viewed and to constitute the wearing surface, then this surface will preferably be smooth and unobstructed, as shown in Figure 2.

It is within the purview of this invention, however, to so otherwise form the surface 3 that it will be ribbed, striated, corrugated or otherwise formed as before stated, but in any event, the indentations 5 formed in the contacting face of this ply will be of less depth than the thickness of the ply, so that the face 3 may be smooth and flat, as stated. In other words, the embossing 6 and the indentations 5 extend through but a portion of the thickness of the ply and the structure is not such that this embossing projects beyond the face of the ply 1.

When the article is viewed from either side, the design interposed between the plies will show through the transparent ply or plies in the same or different degrees of sunken or bas-relief, dependent upon the type of embossing used, to produce ornamental third-dimensional optical effects, due to the various degrees of light reflection and refraction of the various parts thus placed in relief.

The article, shown in Figures 1 and 2 may be made according to different methods, one of which is illustrated in Figure 3. Here the embossed ply 2 is first passed, in the form of a web, between printing rolls P—P' and during the passage between these rolls, its upper face is printed in one or more colors, as may be desired. From the rolls P—P' the web passes between embossing rolls E—E', the former of which is a male and the latter of which is a female and during the passage between these rolls, the web is embossed. After passing between the rolls E—E', the web follows around the latter and is thereby brought into contact with the ply 1. This ply is formed by extruding or flowing this material in semi-liquid state from an extruder or hopper H onto an endless conveyor 7 moving along a table 8, which may be heated or not, as desired. Either or both the rolls E and E' may also be heated.

The plastic material remains in a relatively soft yieldable state when it is contacted by the embossed ply 2 and consequently, the embossing of this latter ply beds itself into the upper surface of the ply 1, while the lower surface of the latter is supported by the conveyor to maintain it plane and undistorted. After leaving the roll E, the ply 1 hardens or sets and the resulting product is ready for use. It corresponds to the article illustrated in Figures 1 and 2.

We have described the under surface of the ply 1, as it appears in Figure 3, as plane and smooth. It is within the purview of this invention, however, to so form the conveyor 7 or the rolls about which it operates, that the under surface of the ply 1 will be molded with corrugations, striations, stipples, prism-like formations or the like. Consequently, while it is preferred to make the under surfaces flat and plane, this does not necessarily need to be the case and in some instances, it is desirable to have it otherwise.

In addition to the manner of forming the article as shown and described in Figure 3, said article may be made in other ways, certain of which we have shown in the following figures of the drawing. The method illustrated in these other figures may be carried out by a traveling web and by the use of rollers for printing, embossing, etc., but for simplicity of illustration, we have shown, in these remaining figures, the use of flat platen operations for carrying out these steps and such operations may be so performed in practice, if desired.

In the method illustrated in Figures 4 and 5, the ply 2, devoid of embossing and appropriately printed to show the desired design on its contacting face, is laid upon flat ply 1, as shown in Figure 4. These two superimposed plies are thereupon laid upon a suitable bed 9 and acted upon by an appropriate embossing die 10, which embosses the ply 2 and simultaneously forces such embossing into the ply 1, while the bed 9 maintains the under surface 3 of the ply 1 against distortion. The die 10 is so constituted and positioned with reference to the design, previously printed upon ply 2, as to register the resulting embossing therewith. After the article has been formed, as stated, the die 10 is retracted and the article is removed from the bed 9. This article is the article of Figures 1 and 2.

The same steps as shown in Figures 4 and 5, together with the pre-printing step, may be carried out with the arrangement of Figure 3, but omitting the upper embossing roll E' and utilizing the lower roll E' to emboss the ply 2 and simultaneously embed it in the ply 1.

According to the procedure shown in Figures 6, 7 and 8, the ply 1 is first placed on an appropriate bed 9 and acted upon a die 11 configurated in accordance with the design to be embossed, as shown in Figure 6. The upper face of the ply 1 is thus provided with indentations 5 corresponding to the desired design. The die 11 is then retracted and there is laid upon the indented face of the ply 1 a flat unembossed ply 2, as shown in Figure 7, which has previously been printed on its under face with the desired design. The two plies are so positioned as to register the printed design with the indentations 5 of the ply 1. The relation of the parts will then be as shown in Figure 7. These parts, having been placed as described, they are acted upon by embossing die 10 to emboss the ply 2 into the indentations 5 previously formed in the ply 1, as shown in Figure 8, to produce the structure of Figure 1.

In the procedure of Figures 9, 10 and 11, the first step illustrated in Figure 9 is identical with the first step of Figure 6, and we may employ the same apparatus to form design indentations in the ply 1. The next step, illustrated in Figure 10, consists in embossing a pre-printed ply 2 between the embossing dies 10 and 10', with the printing in register with the embossing, as shown in Figure 10. Both plies having been formed as shown in Figures 9 and 10, they are superimposed upon one another on a suitable table 9, as shown in Figure 11, and pressed together by die 10 to form the structure of Figures 1 and 2.

In practically carrying out this invention, the indented ply 1 is preferably made somewhat thicker than the ply 2 so that the indentations formed therein to receive the embossing of the ply 2 may be made without distorting the exposed face of said ply.

Articles made in accordance with the present invention are so constituted that the side from which they are normally viewed in use, are of transparent plastic material, so that the design incorporated therein may be seen therethrough. The other ply or plies may be transparent or opaque, as desired, for the particular use of which the article is intended.

In the prior description all forms of the invention are set forth as including both printing and embossing of the embossed ply. We may, however, as an alternate construction, entirely omit the printing of this ply and merely emboss it into the other ply to form the design. If so, the embossed ply should be of a different color or shade than the other ply. We do not consider this nearly as good as the printed embossed form which we have described, but it has definite advantages over prior known articles.

We have described the invention as fundamentally embodying two superimposed plies. We wish it understood, however, that additional plies may be added without departing from the invention.

Having thus fully described the invention, what we claim as new and desire to secure by Letters Patent is:

1. An article of the character described comprising at least two face abutting plies of material, at least one being transparent and one having, on the face which contacts the contiguous ply, a printed design at least a portion of which with the corresponding portion of the ply which carries it, is distorted out of the plane of that ply and positioned within corresponding depressed portions in the contacting face of said contiguous ply.

2. An article of the character described comprising at least two face abutting plies of material, at least one being transparent and one having, on the face which contacts the contiguous ply, a printed design at least a portion of which, with the corresponding portion of the ply which carries it, is distorted out of the plane of that ply and positioned within corresponding depressed portions in the contacting face of said contiguous ply, the depth of said depressed portions being less than the thickness of the latter ply.

3. An article of the character described comprising at least two face abutting plies of material, at least one being transparent and one having, on the face which contacts the contiguous ply, a printed design at least a portion of which, with the corresponding portion of the ply which carries it, is distorted out of the plane of that ply and positioned within corresponding depressed portions in the contacting face of said contiguous ply, the depth of said depressed portions being less than the thickness of the latter ply which is of greater thickness than the distorted ply.

4. An article of the character described comprising at least two face abutting plies of material, at least one being transparent and one having, on the face which contacts the contiguous ply, a printed design at least a portion of which, with the corresponding portion of the ply which carries it, is distorted out of the plane of that ply and positioned within corresponding depressed portions in the contacting face of said contiguous ply and the outer face of the latter ply being plane.

5. An article of the character described comprising at least two face abutting plies of material, at least one being transparent and one having, on the face which contacts the contiguous ply, a printed design at least a portion of which, with the corresponding portion of the ply which carries it, is distorted out of the plane of that ply and positioned within corresponding depressed portions in the contacting face of said contiguous ply and the outer face of said latter ply having an indented surface.

EDWARD KARFIOL.
WILLIAM A. ROEHM.